(12) United States Patent
Zimmer et al.

(10) Patent No.: US 12,025,193 B2
(45) Date of Patent: Jul. 2, 2024

(54) BRAKING AND/OR CLAMPING DEVICE HAVING AN ACTUATING ASSEMBLY AND A SHAFT-COUPLING ASSEMBLY

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

( * ) Notice: Subject to any disclaimer, the term of this patent is extended or adjusted under 35 U.S.C. 154(b) by 531 days.

(21) Appl. No.: 17/299,826

(22) PCT Filed: Dec. 4, 2019

(86) PCT No.: PCT/DE2019/000313
§ 371 (c)(1),
(2) Date: Nov. 1, 2021

(87) PCT Pub. No.: WO2020/114535
PCT Pub. Date: Jun. 11, 2020

(65) Prior Publication Data
US 2022/0049746 A1 Feb. 17, 2022

(30) Foreign Application Priority Data
Dec. 6, 2018 (DE) .................... 10 2018 009 513.5

(51) Int. Cl.
*F16D 55/22* (2006.01)
*B23Q 16/10* (2006.01)
(Continued)

(52) U.S. Cl.
CPC ........... *F16D 55/22* (2013.01); *F16D 65/121* (2013.01); *F16D 65/18* (2013.01); *B23Q 16/105* (2013.01);
(Continued)

(58) Field of Classification Search
CPC .... F16D 55/22; F16D 2121/12; F16D 65/121; F16D 65/18; F16D 55/2245; F16D 2065/1312; B23Q 16/105
See application file for complete search history.

(56) References Cited

U.S. PATENT DOCUMENTS 3,651,909 A * 3/1972 Zautaszwili ............ F16D 55/06
192/106 F
4,026,393 A 5/1977 Gebhardt et al.
(Continued)

FOREIGN PATENT DOCUMENTS

DE 2106009 A1 8/1972
DE 97843 A1 5/1973
(Continued)

*Primary Examiner* — Pamela Rodriguez
(74) *Attorney, Agent, or Firm* — Smartpat PLC

(57) ABSTRACT

A braking and/or clamping device for a shaft guided in relation to a basic body, includes an actuating assembly (10) and a shaft-coupling assembly (80). The actuating assembly comprises a split housing (11) which has two bending plates (15, 16) which can bulge elastically in certain regions. The bending plates each have gripper jaws (23, 24) with frictional surfaces (31, 32). A sealed pressure chamber (37), which can be filled with a pressure medium, is situated between the bending plates. Parts of a shaft-coupling assembly project between the clamping zones, said parts establishing and establish the linking to the braked or clamped shaft. When the pressure in the pressure chamber is relieved, the frictional surfaces of the actuating assembly can be applied to the frictional surfaces of the shaft-coupling assembly, thereby providing the braking and/or clamping force.

9 Claims, 4 Drawing Sheets

(51) Int. Cl.
  *F16D 65/02*   (2006.01)
  *F16D 65/12*   (2006.01)
  *F16D 65/18*   (2006.01)
  *F16D 121/12*  (2012.01)

(52) U.S. Cl.
  CPC .. *F16D 2065/1312* (2013.01); *F16D 2121/12* (2013.01)

(56) References Cited

U.S. PATENT DOCUMENTS

| | | | | |
|---|---|---|---|---|
| 4,335,808 | A | * | 6/1982 | Johnson ............... F16D 55/10 188/72.3 |
| 4,625,837 | A | | 12/1986 | Zimmer |
| 2010/0032252 | A1 | | 2/2010 | Rosa et al. |
| 2019/0186565 | A1 | | 6/2019 | Zimmer et al. |

FOREIGN PATENT DOCUMENTS

| | | |
|---|---|---|
| DE | 3046156 A1 | 7/1982 |
| DE | 102016005549 | 8/2017 |
| DE | 102016009581 | 8/2017 |
| DE | 102017004403 | 11/2018 |
| EP | 0478947 B1 | 12/1994 |
| EP | 0699845 A1 | 3/1996 |
| EP | 3403758 A1 | 11/2018 |
| GB | 2382634 A | 6/2003 |
| JP | 2005147173 A | 6/2005 |
| RU | 2270722 C1 | 2/2006 |
| WO | 2018028731 A1 | 2/2018 |

\* cited by examiner

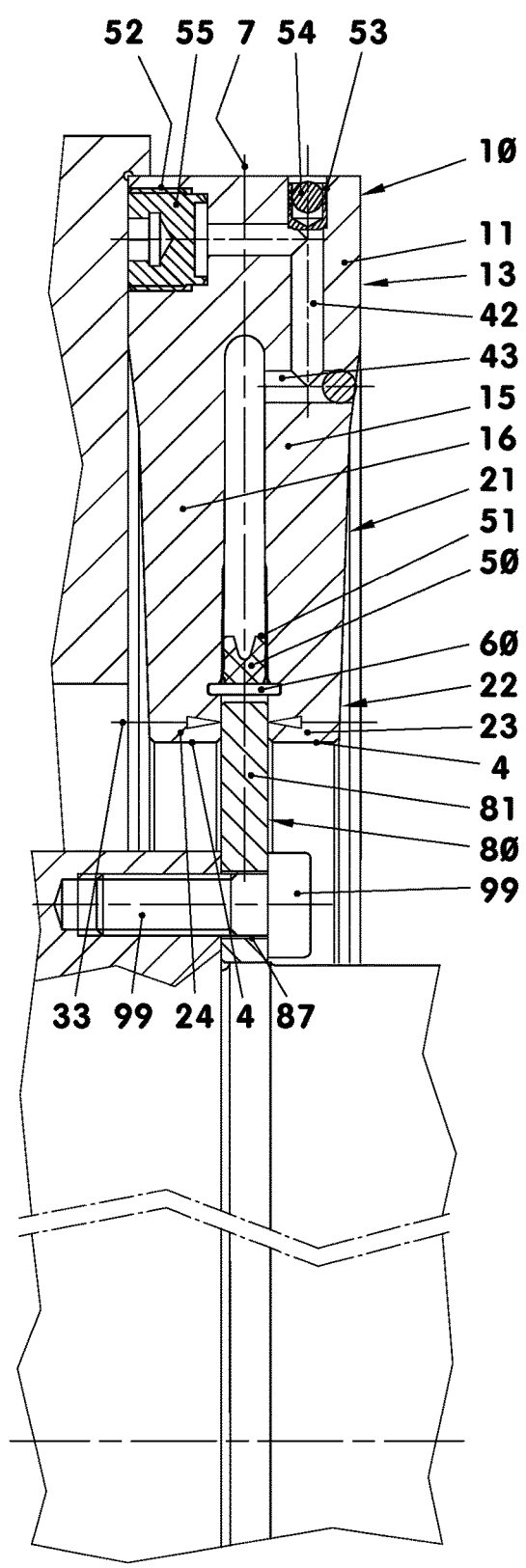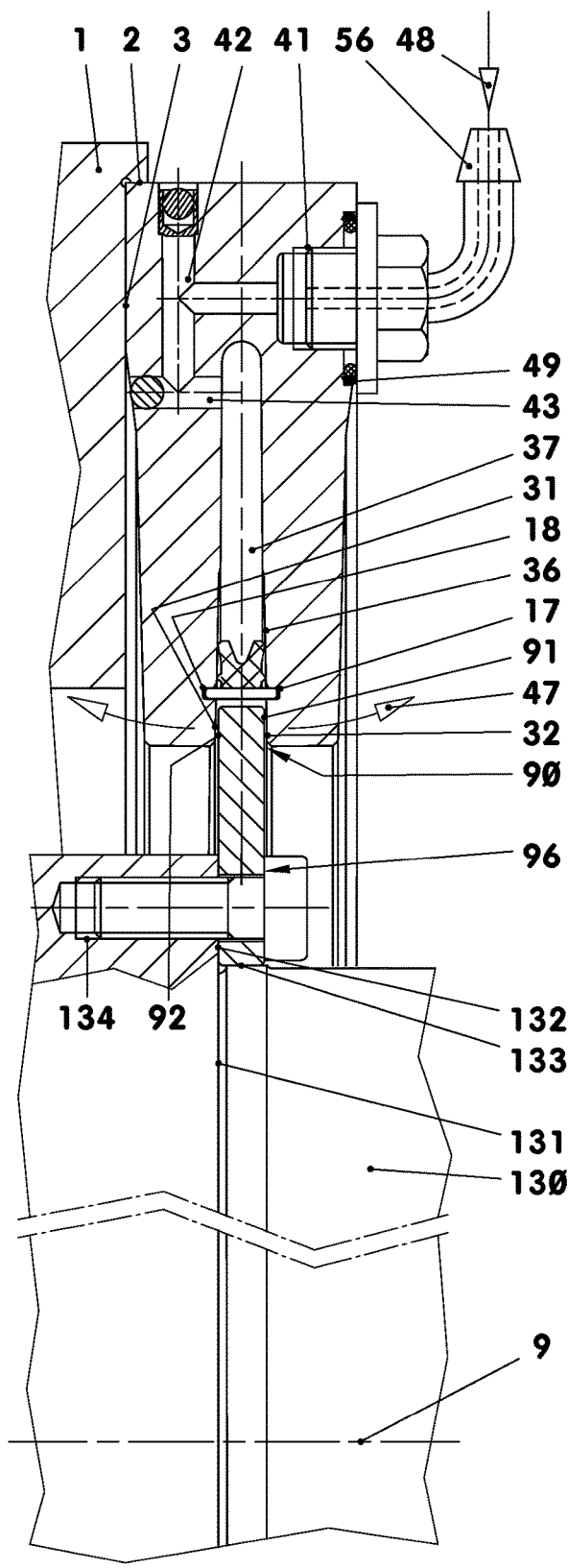
Fig. 2
Fig. 3

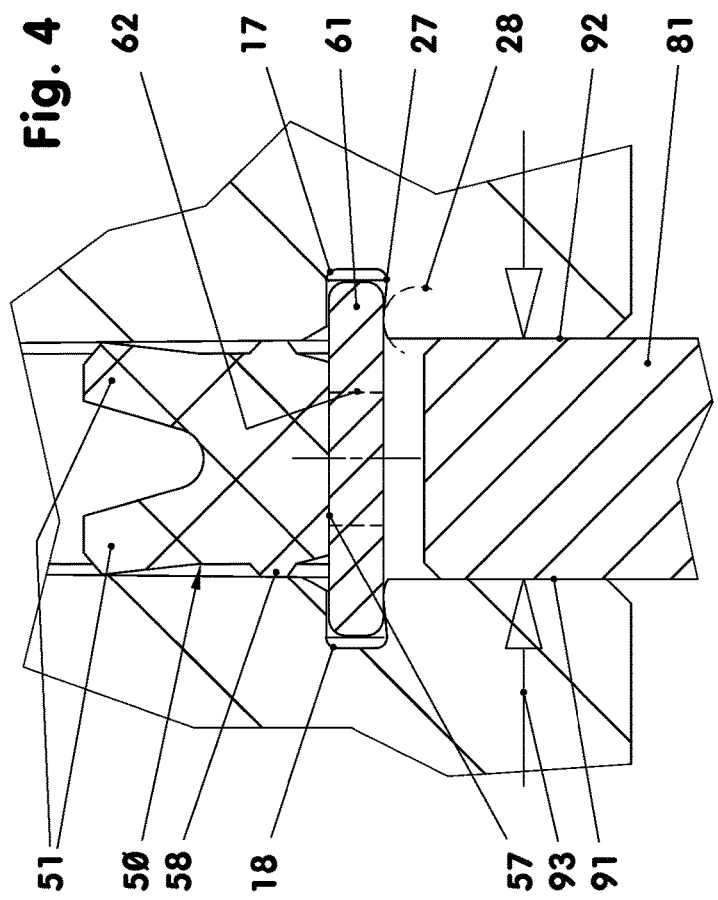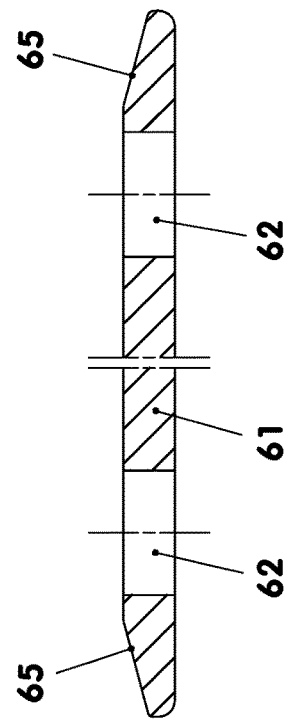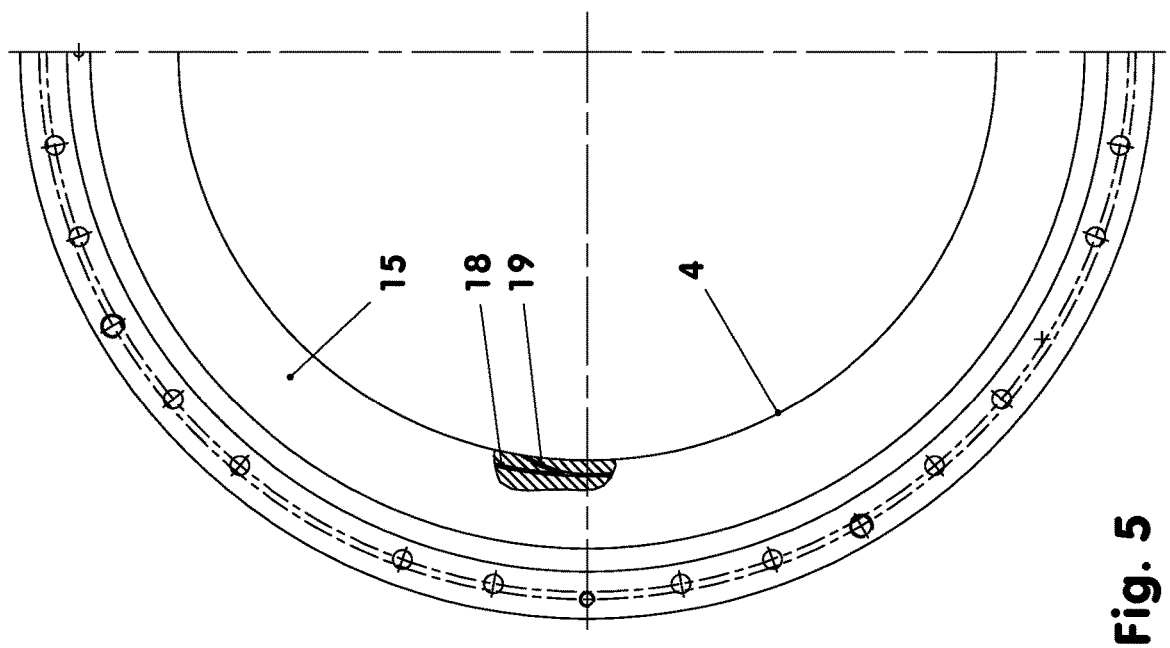

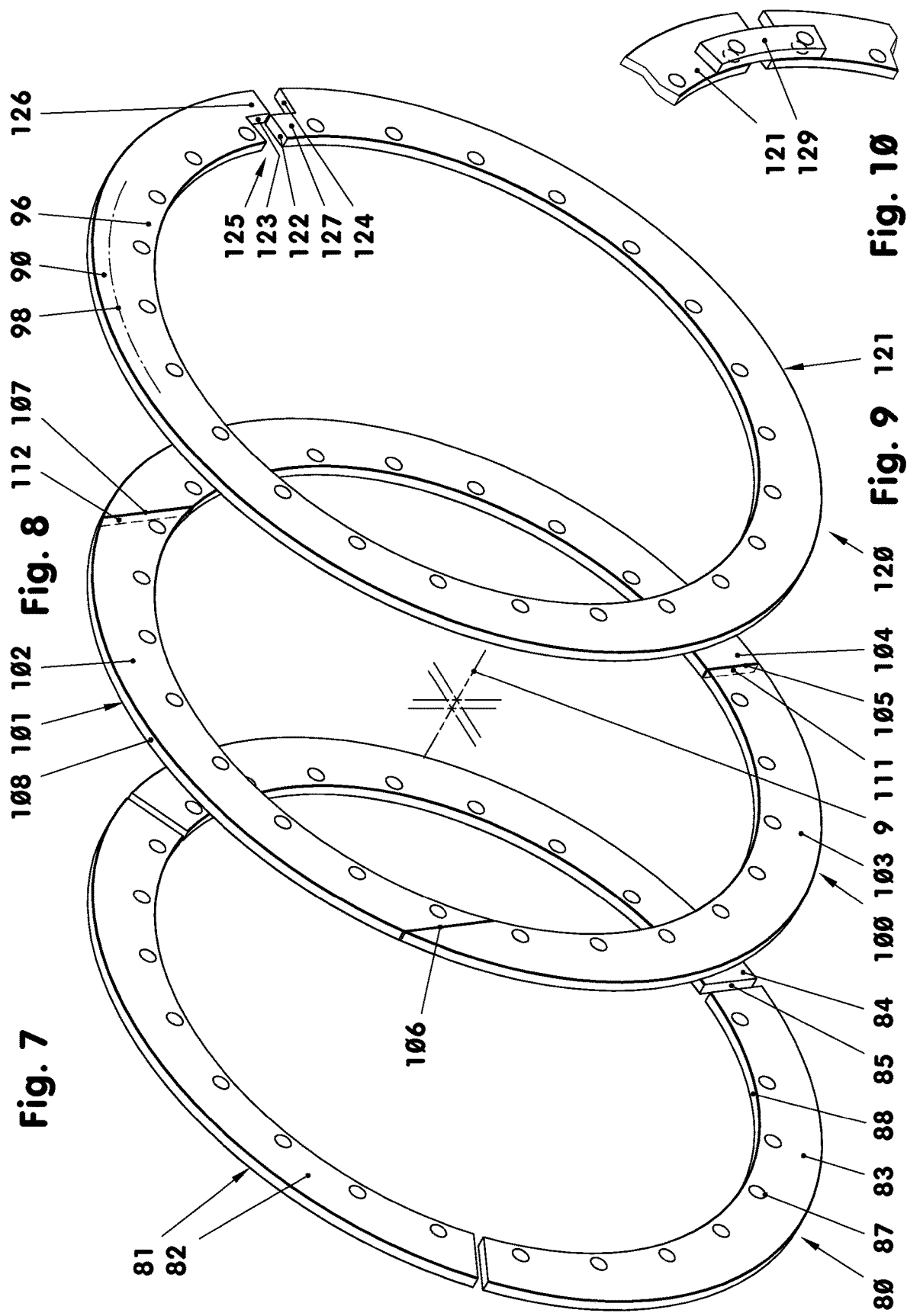

BRAKING AND/OR CLAMPING DEVICE HAVING AN ACTUATING ASSEMBLY AND A SHAFT-COUPLING ASSEMBLY

TECHNICAL FIELD

The disclosure relates to a braking and/or clamping device for a shaft guided in relation to a basic body, comprising an actuating assembly and a shaft-coupling assembly.

BACKGROUND

DE 10 2016 009 581 B3 describes a braking and/or clamping device with an actuating assembly and a shaft-coupling assembly. The device has two bending plates that can bulge connected in one piece to form a split housing, between which a split-type pressure chamber is arranged. The bending plates surround a brake disk from the outside. They are in axial contact with the brake disk, provided that the pressure chamber is relieved of pressure.

SUMMARY

The present disclosure provides a braking and/or clamping device that, even with a large diameter, has a small overall width, consists of few components and also functions adjustably, simply, safely and maintenance-free.

In this case, the actuating assembly has a split housing that has an attachment zone and a bending zone that can bulge elastically in certain regions and has two bending plates spaced apart by a split chamber. In two opposing clamping zones, the bending plates each have gripper jaws with friction surfaces, the surface normals of which are directed inward. Each bending plate has—for supporting at least one support element—an axial groove extending from the split chamber. A sealed pressure chamber, which can be filled with a pressure medium to elastically press the friction surfaces apart, is located between the bending plates and the at least one support element. The shaft-coupling assembly has a slotted or multi-divided ring as the brake disk. The shaft-coupling assembly has a coupling region, which has two spaced friction surfaces, the surface normals of which face outward. The shaft-coupling assembly has a flange region through which it is arranged on the shaft either directly or indirectly through a clamping mechanism. When the pressure chamber is relieved, the friction surfaces of the actuating assembly are applied to the friction surfaces of the shaft-coupling assembly, providing the clamping and/or braking force.

An object of the present disclosure is to provide an at least two-part braking and/or clamping device for shafts. The one part is mounted as an adapter on the rotating shaft and firmly clamped or firmly screwed to it. The other part is a type of gripper, which is attached to a stationary machine part, for example, supporting the aforementioned shaft. The gripper has two, for example ring-shaped, gripper jaws, each arranged on a bending plate, with which they can loosely embrace the end faces of the shaft-side flange or grip them in a rotationally fixed manner. The device parts braking or clamping the shaft do not rest on the outer wall of the shaft oriented in the radial direction.

The bending plates of the device carrying the gripper jaws can be described in simplified terms as two disk springs, the two inner edges of which are turned towards each other, while the outer edges, which are larger in diameter, are widely spaced in the axial direction. A single- or multi-part brake disk is arranged between the inner edges, which form a clamping zone. If the outer edges, which represent the attachment zone, are now moved towards each other in the axial direction, the inner edges, which are smaller in diameter, clamp the brake disk in a spring-loaded gripper-like manner for holding. The disk springs are molded to each other in the region of the outer edges during manufacture, such that the distance between the outer edges can no longer be changed. In order to then release the clamped brake disk, the disk springs are pressed apart with oil pressure. The inner edges release from the brake disk. The disk springs, which were previously little pretensioned for clamping, are thus even more strongly tensioned or deformed, as the case may be, for release.

Alternatively, the device can also be designed in such a way that the split housing is arranged on the rotating shaft, while the brake disk is mounted in a stationary position and projects into the split chamber, which is open radially outward.

The braking and/or clamping device has three different, simply constructed shaft-coupling assemblies. Each shaft-coupling assembly is based on a shaft collar or flange present on the rotating shaft and on a single or multi-piece brake disk. The one-piece brake disk is an open ring that, comparable to a retaining ring that can be arranged in a bore, is inserted into a corresponding groove with an elastic reduction of its outer diameter, wherein the split chamber of the split housing is seen here instead of the groove. Another multi-part brake disk consists in some cases of three or more sections of different sizes, which are joined together almost seamlessly. Another brake disk variant consists of three or more identical sections, which are separated from each other by millimeter-wide gaps. Thereby, the gaps can be radial or tangential. Thereby, the assembly joint formed by the gaps can be designed to be straight, sickle-shaped or circular. The assembly joint can also take any other shape, and it may also have one or more kinks.

Further details of the invention will be apparent from the following description of several schematically illustrated embodiments.

BRIEF DESCRIPTION OF THE DRAWINGS

FIG. 2: Partial cross-section to FIG. 1, actuated and with shaft;

FIG. 3: As in FIG. 2, but unactuated;

FIG. 4: Partial cross-section of the double lip seal and the support element, increased;

FIG. 5: Half-view of the split housing with threading groove in one section;

FIG. 6: Partial longitudinal section of the support element, enlarged;

FIG. 7: Perspective view of a radially divided brake disk;

FIG. 8: Perspective view of an unevenly divided brake disk;

FIG. 9: Perspective view of a single-slotted brake disk;

FIG. 10: Perspective view of FIG. 9 with counterweight.

DETAILED DESCRIPTION

Figure 1:
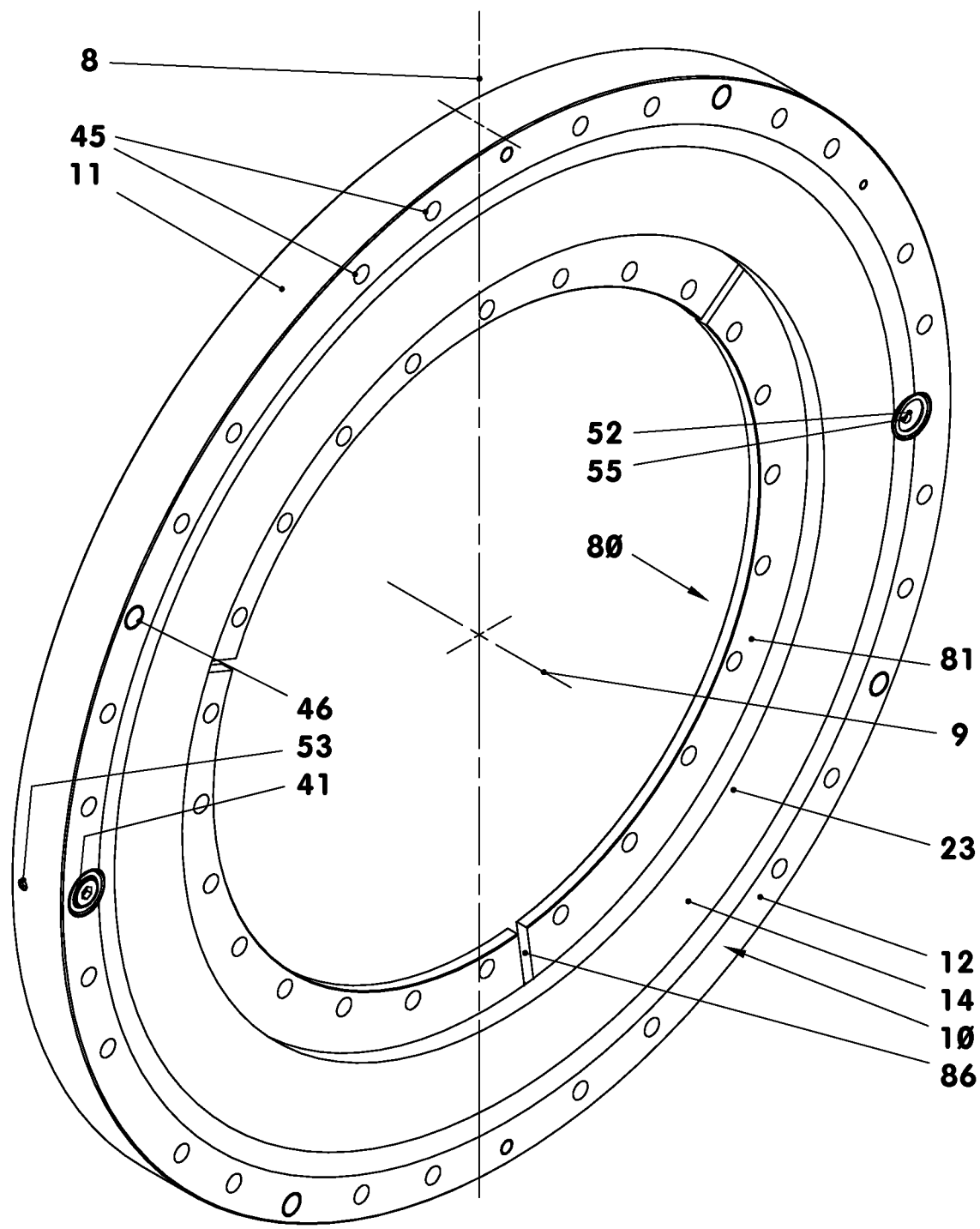
FIG. 1: Perspective view of a braking and/or clamping device.

FIG. 1 shows the braking and/or clamping device without the supporting machine-side basic body (1), see FIGS. 2 and 3, and without the shaft (130) to be braked and/or clamped. The external actuating assembly (10) surrounding the shaft (130) has a rear attachment surface (3) via which it is screwed to the basic body (1) by means of screws (not shown). The actuating assembly (10) surrounds a shaft-coupling assembly (80), which in this case consists of a multi-divided brake disk (81). The brake disk (81) is torsionally rigidly fastened to the shaft (130) by means of the screws (99). The actuating assembly (10) has an elastic split housing (11), the gripper jaws (23, 24) of which—when braking or clamping—rest against the brake disk (81) in a gripper-like manner. The split housing (11) encloses a pressure chamber (37) together with a sealing ring (50) and a support element (60). If the latter is subjected to a gaseous, liquid or gel-like pressure medium, the gripper-like grasp on the brake disk (81) is released.

The pressure chamber (37), see FIG. 2, has a volume less than 12.5 percent of the envelope volume of the actuating assembly (10). The envelope volume of the variant of this actuating assembly (10) shown in the figures corresponds to a given volume of a tubular body having as its tube length the device width, as its outer diameter the outer device diameter and as its inner diameter the minimum inner diameter of the bending plates (15, 16).

The actuating assembly (10) has an annular or tubular, as the case may be, split housing (11), which encloses the annular pressure chamber (37), which is narrow-gap, for example. In its undeformed state, the split housing (11) is essentially a planar disk with an inner diameter of, for example, approximately 280 mm and an outer diameter of, for example, 388 mm. For example, the maximum thickness of the disk is 22 mm. It corresponds to the device width specified above. The split housing (11) is made of a heat-treatable steel, for example 42CrMoS4. It is divided into three regions (13, 21, 22), which adjoin each other in the radial direction. The inner region is the clamping zones (22). They are each adjoined by a bending zone (21) located further out in the radial direction. Both bending zones (21) open into an outer region, that is, the attachment zone (13).

The split housing (11) is milled out from its central bore (4) centrally between the end faces to produce the split chamber (37). For this purpose, a disk milling cutter may be used. The milled groove, for example 38.7 mm deep, has a gap width of, for example, 4 mm. Here, the channel-shaped groove base has a radius of 2 mm to minimize notch stresses. In the region of the bore (4) close to the bore, the split chamber groove 16.5 mm deep is widened to 4.3 mm in the precision machining zone (36).

The attachment zone (13), into which the splitting space (37) does not project or projects only 1 to 10 mm, has, for example, on both sides a planar end face at least in certain regions via which the splitting housing (11) can be placed against an attachment surface (3) of the basic body (1), see FIGS. 3 and 2. By way of example only, the split housing (11) also contacts the centering device (2) on the basic body side. The attachment zone (13) has a bore group with, for example, 24 bores (45) for fastening to the basic body (1) on a diameter of, for example, 370 mm. The bores (45) are grouped in pairs, with two bores each enclosing an angle of 10 angular degrees with respect to the center line (9). Such bores (45) can also be counterbores or double counterbores.

On a diameter of, for example, 375 mm, there are four threaded through bores (46) with an M8 thread, see FIG. 1. They are each divided by 90 degrees of angle to each other. An inlet threaded bore (41) and a plug threaded bore (52) are located between at least two adjacent pairs of bores (45). The bores (41, 52) are diametrically opposed within the actuating assembly (10), for example, on different diameters. They are arranged either on one end face (12) or (14) of the attachment zone (13) or on different end faces (12, 14), see FIGS. 1, 2 and 3.

In accordance with FIG. 3, at least one inlet threaded bore (41) is located in the attachment zone (13) on the front side (12) of the actuating assembly (10). The M10 fine thread used here accommodates a hydraulic adapter (56) as shown in FIG. 3—by way of example only. Alternatively, the inlet threaded bore (41) with its cutting ring (49) and the sealing ring resting against it can also be located on the rear side of the actuating assembly (10), see FIG. 1. The cutting ring (49) here supports the sealing effect between the attachment surface (3) and the rear side of the actuating assembly (10).

The inlet threaded bore (41), see FIG. 3, opens into a radial distribution bore (42). This distribution bore (42) is closed to the outside by a clamping sleeve (53). A compression ball (54) is wedged into the bore of the clamping sleeve (53), which permanently fixes the clamping sleeve (53) in the individual radial distribution bore (42) in an oil-tight or gas-tight manner. For example, the radial distribution bore (42) meets an axial distribution bore (43) perpendicularly, which opens into the pressure chamber (37). The axial distribution bore (43) is tightly sealed towards the attachment surface (3), for example with a compression ball.

Here, the distribution bores (42, 43) have a diameter of 3 mm. The hydraulic oil flowing in via the hydraulic adapter (56), for example an oil of type HLP 46 according to DIN 51524, Part 2, which has a viscosity of 46±2 $mm^2/s$ at 40° Celsius, is rapidly distributed in the pressure chamber (37).

According to FIG. 2, at least one threaded plug bore (52) is also located in the attachment zone (13), which—for example serving as a vent bore when filling the pressure chamber (37)—also opens into a radial distribution bore (42), and from there is connected to the pressure chamber (37) via an axial distribution bore (43). To the outside, such distribution bores are closed in a similar way as the distribution bores of the inlet.

The two bending plates (15, 16) molded onto the attachment zone (13) represent the elastic bending zone (21). The elastically deformable bending plates (15, 16) located on both sides of the split chamber (37) taper—with respect to their wall thickness—from the outside in the direction of the central center line (9). In the exemplary embodiment, their wall thickness is reduced from, for example, 9 to 7.35 mm. The dimensional rigidity of the bending plates (15, 16) thus decreases almost continuously in the direction of the clamping zone (22). The transitions between zones (13) and (21), for example, are rounded out with large radii. The bending zone (21) is recessed relative to the attachment zone (13) so that the deformation of the bending zone (21) does not enter the installation joint located between the basic body (1) and the attachment zone (13).

The bending plates (15, 16) of the bending zone (21) merge towards the respective shaft-coupling assembly (80) into the two clamping zones (22), which represent the circumferential gripper jaws (23, 24). The gripper jaw (23, 24) are also a part of the respective bending plate (15, 16).

Each bending plate (15, 16) has a circumferential axial groove (17, 18) between the bending zone (21) and the clamping zone (22). The axial groove (17, 18), which has, for example, a rectangular cross-section, has a width of, for example, 1.1 mm at a depth of, for example, 1.35 mm. The two edges of the axial groove base are rounded. In the exemplary embodiment, the groove wall of the axial groove (17, 18) closest to the bore (4) is 4.5 mm away from the bore (4). The individual axial groove (17, 18) is machined out of the respective bending plate (15, 16) with a disk milling cutter. For this purpose, the disk milling cutter has an outer diameter that is slightly smaller than the inner diameter of the bore (4). In addition, the disk milling cutter preferably has only three teeth, each of which protrudes 1.4 mm beyond the milling disk on the right and left. The milling disk itself has a wall thickness of 1.0 mm. To create the axial grooves (17, 18), the disk milling cutter is inserted into the pressure chamber (37) with one tooth in front between the bending plates (15, 16). When the split housing (11) is rotating, the non-rotating disk milling cutter is fed in the direction of the bending plate (15), in order to mill the axial groove (17), and when this is completed, it plunges into the bending plate (16) in the opposite direction, in order to there mill out the axial groove (18).

In accordance with FIG. 5, the axial groove (17, 18) has a threading groove (19). The latter is present only once in each bending plate (15, 16). It has a radius of curvature of, for example, 30 to 60 mm. In the exemplary embodiment, the radius of curvature amounts to 40 mm. The single threading groove (19) merges tangentially into the corresponding axial groove (17, 18). The cross-section of the threading groove (19) corresponds to that of the single axial groove (17, 18).

An elastically deformable metallic support strip (61) is inserted in the axial groove (17, 18) as a support element (60), which is made, for example, from cold-rolled spring strip steel Ck 101 or from natural-hard spring steel 38 Si 6. The support strip (61) has a length that corresponds to the mean length of the individual axial groove (17, 18) minus a clearance of 1 mm. With a wall thickness of, for example, 1 mm, it has a width of, for example, 6.9 mm. According to FIGS. 1, 2 and 4, the support strip (61) has a rectangular cross-section. All four edges are chamfered or rounded. In the radial and axial direction—with an undeformed split housing (11)—it has a 0.1 mm clearance in the axial groove (17, 18).

In accordance with FIG. 4, the groove wall (27) closest to the bore (4) of the split housing (11) is a multi-curved spatial surface. In order to enable an edge support-free support in the axial groove (17, 18) when the support strip (61) is bent—transversely to its longitudinal extension—the groove wall (27) has, instead of a cylindrical surface in the contact zone, a partial surface (28) of a torus, the curvature of which is shown as a dashed line in FIG. 4. The small cross-section of the torus has a diameter of, for example, 1.4 mm. Towards the bottom of the axial groove (17, 18), the groove wall (27) moves away tangentially from the underside of the support strip (61) with a frustoconical surface adjacent to the torus partial surface (28).

The centers of the contact points between the support strip (61) and the groove walls (27) are, for example, 5.4 mm apart when the brake disk (81, 101, 121) is clamped tight.

The support strip (61), see FIG. 6, has a tension bore (62) in the region of each of its ends, the diameter of which measures, for example, 2.5 mm. The center line of the individual tension bore (62) is spaced from the ends by, for example, 4 mm in each case. Via at least one tension bore (62), the support strip (61) is threaded into the axial groove (17, 18) via the threading groove (19), for example with the aid of a punch, usually in the embedded state and after prior insertion of the sealing ring. For disassembly, the support strip (61) can also be removed from the split housing (11) using a punch through the threading groove (19).

To facilitate the threading process, the support strip (61) has a 15° chamfer (65) at the front and rear, which extends over 2 mm of the support strip length. All front edges are chamfered or rounded.

Each gripper jaw (23, 24) has a planar friction surface (31, 32) between the axial groove (17) and the bore (4). In the exemplary embodiment, the friction surfaces (31, 32), which are oriented parallel to the center plane (7), have an average radius of 113.8 mm. In the clamping zone (22), the maximum width of the friction surface (31) amounts to, for example, 3.6 mm.

The friction surfaces (31, 32) may possibly be formed as frustoconical surfaces, such that, when the brake disk (81, 101, 121) is clamped, the friction surfaces (31, 32) are in full-surface and planar contact with the respective brake disk.

After the braking and/or clamping device has been assembled, the gripper jaws of the actuating assembly (10), with the braking and/or clamping device clamped, rest against the respective brake disk (81, 101, 121) of the corresponding shaft-coupling assembly (80, 100, 120), see FIG. 2. The friction surfaces (31, 32) of both gripper jaws (23, 24) have inwardly directed surface normals (33). The latter point in the direction of the center plane (7).

Instead of the planar friction surfaces (31, 32), which are also oriented parallel to the attachment surface (3), the friction surfaces can also have the shape of a truncated cone or a partial region of a torus.

Radially towards the center line (9), the split or pressure chamber (37), as the case may be, is closed off by a double lip seal (50). The double lip seal (50), made of, for example, a polyurethane with a Shore D hardness of 57, has two radially outwardly oriented sealing lips (51), each of which rests against the lateral walls of the pressure chamber (37) due to its own elasticity and/or additionally due to the internal pressure present in the pressure chamber (37). The bore wall (57) of the double lip seal (50) rests on the smooth radial outer wall of the support strip (61). According to FIG. 4, the double lip seal (50) has a support bar (58) on both sides approximately 1 mm above the bore wall (57), via which the double lip seal (50)—to improve the fit in the pressure chamber (37)—additionally rests against the inner walls of the gap chamber (37).

FIGS. 2, 3, 7 to 9 show three differently constructed brake disks (81, 101, 121) as shaft-coupling assemblies (80, 100, 120), each of which is attached to a shaft (130) carrying it. For this purpose, the shaft (130) has a shaft collar (131) with a planar collar surface (132). The shaft (130) reduces its diameter there from, for example, 262 mm to, for example, 237 mm. It has a centering shoulder (133), for example 4.5 mm wide, with a diameter of, for example, 238 mm below the collar surface (132). The shaft collar (131) has 24 equidistantly divided M6 threaded bores (134), which are on a diameter of, for example, 249 mm.

FIGS. 7-9 show three different brake disks (81, 101, 121), the parts of which are arranged here as they are positioned against each other in the installed condition. Each brake disk is, at least as an enveloping volume, a planar disk with a wall thickness of, for example, 4.7 mm, a cylindrical shell-shaped inner wall and a cylindrical shell-shaped outer wall. The inner wall forms the centering bores (88). The large planar surfaces of the brake disks (81, 101, 121) are precision machined. The outer part of the plane surface, see FIG. 9, is the coupling region (90) of the brake disk. It is divided into the two friction surfaces (91, 92) on the brake disk side. The friction surfaces (91, 92) have outwardly directed surface normals (93), see FIG. 4. The clamping direction of the braking and/or clamping device is oriented opposite to the direction of such surface normals (93). The inner part of the planar surface of the brake disk is the flange region (96) of each brake disk (81, 101, 121). Both regions are separated by the dash-dotted auxiliary line (98) shown as an alternative in FIG. 9.

The friction surfaces (91, 92) or the friction surfaces (31, 32) of the split housing (11) can have a surface structure. For example, this is created by sandblasting or by a diamond or sapphire coating. Such coatings have a layer thickness of, for example, 0.038 mm. The average grain size of the coating base material at this layer thickness is 30 µm.

The individual brake disk or its envelope volume, as the case may be, has, for example, 24 bores (87) with a diameter of 6.4 mm for fastening to the shaft (130).

The brake disk (81) consists of three uniform circular ring pieces (82-84). For example, the center angle measures 118.08 angular degrees. Accordingly, in the exemplary embodiment, the three radial gaps (85) each have a gap width of 4 mm. With this variant, the radial gaps (85) are required in order to be able to insert the brake disk circular ring pieces (82-84) one after the other into the split housing (11) from the bore (4).

The brake disk (101) also consists of three brake disk pieces (102-104). The two pieces (103, 104) are congruent here. Both pieces are separated by a radial gap (105), whose gap width is, for example, 0.0 to 0.5 mm. The gap width is given by the wire thickness of the eroding wire cutting the brake disk (101) into the three pieces (102-104). Theoretically, the gap width can also amount to 0 mm, provided that the pieces (102-104) are manufactured individually.

The outer walls (108) of the two brake disk pieces (102104) enclose an angle of, for example, 132.1 angular degrees. In this case, a first end face of each of the brake disk pieces (103, 104) is almost a radial surface (111), that is, the end face (111) lies in a plane in which the center line (9) also lies. The respective other, second end face is a parallel face (112), which is oriented parallel to the first end face (111).

Between the parallel surfaces (112) of the brake disk pieces (103, 104), the brake disk piece (102) is inserted as a central part in FIG. 8. The latter also has end faces oriented parallel to each other, but here both end faces have the same surface area. An inclined gap (106, 107) is located between each of the end faces of the center part (102) and the single end face (112) of the respective adjacent side part (103, 104). With such brake disk (101), the side parts (103, 104) are initially inserted between the friction surfaces (31, 32) of the split housing (11), in order to then insert the center part (102) into the existing gap almost seamlessly.

According to FIG. 9, the brake disk (121) is formed in one piece. It forms an open ring, the separation point (125) of which consists of a double-angled gap (122-124), such that the brake disk (121) forms an outer lug (126) in one end region and an inner lug (127) in the other end region. The lugs (126, 127) overlap by more than 0.1 mm in the circumferential direction. The gap includes an inner radial part gap (122), a center circumferential part gap (124), and an outer radial part gap (123). The radial part gaps (122, 123) adjoin end face regions, each of which lies in a plane in which the center line (9) also lies. The smallest gap width of the inner radial part gap (122) measures in the circumferential direction at least $$RS=6/5*\pi*(d_{Ba}-d_{Gi}) \text{ in mm.}$$

In the example, it amounts to 10.4 mm. The center circumferential part gap has a width of, for example, 0.75 mm. For mounting the brake disk (121), its circumference is reduced before insertion into the split housing (11)—under elastic deformation—to such an extent that its outer wall (108) fits through the bore (4).

In the elastically deformed state, the lugs (126, 127) lie next to each other. The radial part gaps (122, 123) have been reduced to a few micrometers. After the brake disk (121) has sprung up in the split housing (11), it again assumes the shape shown in FIG. 9.

The separation point (125) of the brake disk (121) causes an imbalance acting on the shaft (130). To compensate for this imbalance, see FIG. 10, a circular ring-like balancing mass (129) is arranged in the region of the separation point (125). The latter covers the inner radial part gap (122). The leveling compound (129) is fastened using the screws (99).

The single mounted brake disk (81, 101, 121) is seated, on the one hand, with its centering bore (88) on the centering shoulder (133) of the shaft (130). On the other hand, it rests against the collar surface (132). The, for example, 20 screws (99) hold the brake disks (81, 101, 121) in a torsionally rigid manner on the shaft collar (131).

This braking and/or clamping device is delivered in combination with the selected shaft-coupling assembly (80, 100, 120). In this case, the respective shaft-coupling assembly (80, 100, 120) is seated coaxially in the actuating assembly (10). For mounting in the machine receiving the device, the shaft-coupling assembly (80, 100, 120) is slid onto the shaft (130) and fastened there directly to the attachment surface (3) of the basic body (1)—usually in a releasable manner. Finally, the fastening screws are inserted into the corresponding bores on the basic body side and screwed in place.

If there is no hydraulic oil operating pressure in the pressure chamber (37), the shaft (130) is clamped against the basic body (1). The pressure chamber (37) has no appreciable oil pressure, since the oil supply is relieved via a valve, not shown, into the oil tank. The bending plates (15, 16) rest preloaded against the brake disk (81, 101, 121) via their gripper jaws (23, 24), see FIG. 2. The preload results from the spring rate of the prebent bending plates (15, 16). The spring rate is a function of the material selection on the ring disk side and the geometry of the bending zone (21). In the exemplary embodiments, the braking or holding torque, as the case may be, generated is 3000±200 Nm.

The bending plates (15, 16) would only be in a completely relaxed state if no brake disk (81, 101, 121) were located between the gripper jaws (23, 24). Then, in the exemplary embodiment, the pressure chamber (37) would be a split chamber with constant gap width.

To release the braking and/or clamping device, the oil pressure in the pressure chamber (37) is increased to, for example, 100 to 150*10$^5$ Pa via the hydraulic adapter (56), see FIG. 3. From the hydraulic adapter (56), the pressure increase propagates through the distribution bores (42) and (43) into the pressure chamber (37). The bending plates (15, 16) bulge in the elastic bending zones (21), see FIG. 3. Thereby each clamping zone (22) moves outward essentially in the axial direction relative to the attachment zone (13), which remains stationary. The gripper jaws (23, 24) lift off the brake disk (81, 101, 121) in the direction of the arrows (47). The friction surfaces (31, 32) on the actuating assembly side move away from the friction surfaces (91, 92) on the shaft-coupling assembly side, such that there is no longer any contact between the shaft (130) and the basic body (1). The clearance per pair of friction surfaces (31) to (91) and (32) to (92), that is, the distance between the previously contacting friction surfaces, now amounts to between 0.3 and 0.5 mm. The device is designed for 5 to 10 million opening or closing cycles, as the case may be.

LIST OF REFERENCE SIGNS

1 Basic body
2 Centering device, outer centering device

3 Attachment surface of (1)
4 Bore, central from (10)
7 Center plane
8 Notional axis, vertical, lies in (7)
9 Center line of the device, central
10 Actuating assembly
11 Split housing, which can bulge in certain regions
12 Front side, end face
13 Attachment zone
14 Outer wall, end wall, end face
15 Bending plate, outer
16 Bending plate, inner
17 Axial groove in (15)
18 Axial groove in (16)
19 Threading groove
21 Bending zones, bulging, elastic
22 Clamping zones
23 Gripper jaw, integrally molded, right
24 Gripper jaw, integrally molded, left
27 Groove wall
28 Torus partial surface
31, 32 Friction surfaces
33 Surface normals of (31, 32)
36 Precision machining zone
37 Pressure chamber; split chamber; groove
41 Inlet threaded bores
42 Distribution bore, radial
43 Distribution bore, axial
45 Bores, fastening bores
46 Threaded through bores
47 Arrows, direction of movement
48 Hydraulic oil inlet
49 Cutting ring
50 Double lip seal, sealing ring
51 Sealing lips
52 Plug threaded bore
53 Clamping sleeve
54 Compression ball
55 Closing plug
56 Hydraulic adapter
57 Bore wall of (50)
58 Support bar
60 Support element
61 Support strips
62 Tension bore, cross-bore
65 15° chamfer
80 Shaft-coupling assembly, radial partition
81 Brake disk, three-piece, radially divided; ring
82-84 Brake disk circular ring pieces, sections
85 Radial gaps
86 Assembly joints
87 Bores
88 Centering bore
90 Coupling region
91, 92 Friction surfaces
93 Surface normals of (91, 92)
96 Flange region
98 Auxiliary line
99 Screws
100 Shaft-coupling assembly, mixed partition
101 Brake disk, three-piece, mixed divided; ring
102 Center part, brake disk piece, section
103, 104 Side parts, brake disk pieces, sections
105 Radial gap
106, 107 Inclined gap
108 Outer wall, cylindrical shell-shaped
111 End face, first; radial surface
112 End face, second; parallel face
120 Shaft-coupling assembly, single slotted
121 Brake disk, step-slotted; ring
122 Radial part gap, inner
123 Radial part gap, outer
124 Circumferential part gap, center
125 Separation point
126 Lug, outer
127 Lug, inner
129 Leveling compound
130 Shaft
131 Shaft collar
132 Collar surface, planar
133 Centering shoulder
134 M6 threaded bores
RS Average radial part gap width
$d_{Ba}$ Outside diameter of brake disk (121)
$d_{Gi}$ Bore diameter (4) of the split housing (11)

The invention claimed is:

1. A braking and/or clamping device for a shaft (130) that is guided in relation to a basic body (1), comprising:
   an actuating assembly (10); and
   a shaft-coupling assembly (80, 100, 120),
   wherein the actuating assembly (10) has a split housing (11) that has an attachment zone (13) and a bending zone (21) that can bulge elastically in certain regions and has two bending plates (15, 16) spaced apart by a split chamber (37),
   wherein each bending plate (15, 16) has, in two opposing clamping zones (22), gripper jaws (23, 24) with friction surfaces (31, 32), surface normals (33) of which are directed inward,
   wherein each bending plate (15, 16) has, for supporting at least one support element (60), an axial groove (17, 18) extending from the split chamber (37),
   wherein a sealed pressure chamber (37) is arranged between the bending plates (15, 16) and the at least one support element (60),
   wherein the sealed pressure chamber (37) can be filled with a pressure medium to elastically press the friction surfaces (31, 32) apart,
   wherein the shaft-coupling assembly (80, 100, 120) has a slotted or multi-divided ring as a brake disk (81, 101, 121),
   wherein the shaft-coupling assembly (80, 100, 120) has a coupling region (90), which has two spaced friction surfaces (91, 92), surface normals (93) of which face outward,
   wherein the shaft-coupling assembly (80, 100, 120) has a flange region (96) through which it is arranged on the shaft (130) either directly or indirectly through a clamping mechanism; and
   wherein, when the pressure chamber (37) is relieved, the friction surfaces (31, 32) of the actuating assembly (10) are applied to the friction surfaces (91, 92) of the shaft-coupling assembly (80, 100, 120), providing a clamping and/or braking force.

2. The braking and/or clamping device in accordance with claim 1,
   wherein the axial grooves (17, 18) of the bending plates (15, 16) are arranged in a region between the friction surfaces (31, 32) and a bottom of the split chamber (37).

3. The braking and/or clamping device in accordance with claim 2, wherein the support element (60) is an elastically deformable metallic support strip (61), a length of which corresponds to an average length of the axial grooves (17, 18).

4. The braking and/or clamping device in accordance with claim 3,
wherein the support strip (61) has a cross-bore (62) at least in a region of one end.

5. The braking and/or clamping device in accordance with claim 3,
wherein each axial groove (17, 18) has a threading groove (19) opening into it.

6. The braking and/or clamping device in accordance with claim 1,
wherein the brake disk (81, 101, 121) or its sections (82-84; 102-104) are planar on both sides.

7. The braking and/or clamping device in accordance with claim 1,
wherein the brake disk (81) comprises at least three brake disk circular ring pieces (82-84) of equal size,
wherein assembly joints (86) located between the brake disk circular ring pieces (82-84) have a gap width of at least 4 mm.

8. The braking and/or clamping device in accordance with claim 1,
wherein the brake disk (101) consists of at least three brake disk pieces (102-104) having the same mass,
wherein the shortest connecting lines between device center line (9) and two adjacent centers of mass each enclose the same angle.

9. The braking and/or clamping device in accordance with claim 1,
wherein the brake disk (121) has a stepped separation point (125), a radial part gap (122) of which has a width (RS) in the circumferential direction of at least $RS=6/5*\pi*(d_{Ba}-d_{Gi})$ in mm, with $d_{Ba}$ being an outside diameter of the brake disk (121), and doi being a bore diameter (4) of the split housing (11).

\* \* \* \* \*